United States Patent
Christensen et al.

(10) Patent No.: US 11,798,044 B2
(45) Date of Patent: *Oct. 24, 2023

(54) PLUGGABLE ARCHITECTURE FOR PERFORMANCE OF PRICING OPERATIONS

(71) Applicant: Salesforce, Inc., San Francisco, CA (US)

(72) Inventors: Mitchell Christensen, Livermore, CA (US); Parth Vijay Vaishnav, Newark, CA (US); Wei Gao, Sunnyvale, CA (US); Binyuan Chen, Belmont, CA (US)

(73) Assignee: Salesforce, Inc., San Francisco, CA (US)

( * ) Notice: Subject to any disclaimer, the term of this patent is extended or adjusted under 35 U.S.C. 154(b) by 537 days.

This patent is subject to a terminal disclaimer.

(21) Appl. No.: 16/779,373

(22) Filed: Jan. 31, 2020

(65) Prior Publication Data

US 2021/0241329 A1    Aug. 5, 2021

(51) Int. Cl.
*G06Q 30/02* (2023.01)
*G06Q 30/0283* (2023.01)

(52) U.S. Cl.
CPC ................ *G06Q 30/0283* (2013.01)

(58) Field of Classification Search
CPC ........ G06Q 30/0283; G06Q 30/0206
(Continued)

(56) References Cited

U.S. PATENT DOCUMENTS 5,577,188 A    11/1996    Zhu
5,608,872 A    3/1997    Schwartz et al.
(Continued)

FOREIGN PATENT DOCUMENTS

CA    2285190    10/1998
WO    WO-0135293 A1 *  5/2001    ............. G06Q 30/06
(Continued)

OTHER PUBLICATIONS

"Plug-in Architectures"; Dec. 16, 2013; developer.apple.com; 6 pages. (Year: 2013).*
(Continued)

*Primary Examiner* — Shannon S Campbell
*Assistant Examiner* — Freda A Nelson
(74) *Attorney, Agent, or Firm* — Kwan & Olynick LLP (57) ABSTRACT

Embodiments are directed to a pluggable architecture for performance of pricing operations. An embodiment of a storage medium includes instructions for installing multiple pricing methods at a pricing service including a pluggable architecture for pricing methods, each pricing method including a set of pricing functions; receiving a pricing request for a sales transaction including one or more sales items, the pricing request including a pricing context for each sales item; and performing a price calculation for the sales transaction, including resolving a pricing method for each sales item, applying the set of pricing functions for the resolved pricing method for each sales item, the application of the set of pricing functions being based at least in part on the pricing context for the sales item, calculating a price for each sales item based upon an outcome of the pricing functions, and aggregating the calculated prices for the sales items.

19 Claims, 8 Drawing Sheets

(58) Field of Classification Search
USPC .................................................. 705/7.35, 400
See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,078,854 A | 6/2000 | Breed |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,584,155 B1 | 9/2009 | Carter, III et al. |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0267674 A1* | 12/2004 | Feng ............... G06Q 30/0278 705/306 |
| 2004/0268299 A1 | 12/2004 | Lei et al. |
| 2005/0050555 A1 | 3/2005 | Exley et al. |
| 2005/0066058 A1 | 3/2005 | An |
| 2005/0091098 A1 | 4/2005 | Brodersen et al. |
| 2008/0255973 A1 | 10/2008 | Wade et al. |
| 2008/0275758 A1 | 11/2008 | Clayton |
| 2008/0312994 A1 | 12/2008 | Clayton |
| 2009/0177744 A1 | 7/2009 | Marlow et al. |
| 2009/0248429 A1 | 10/2009 | Doenig |
| 2010/0223104 A1 | 9/2010 | Patel et al. |
| 2012/0078815 A1 | 3/2012 | Rossi |
| 2013/0304571 A1 | 11/2013 | Swinson |
| 2014/0067479 A1 | 3/2014 | Stacklin |
| 2014/0108093 A1 | 4/2014 | Yu |
| 2015/0012467 A1 | 1/2015 | Greystoke |
| 2018/0330324 A1 | 11/2018 | McCandless |
| 2019/0080394 A1 | 3/2019 | Wang |
| 2019/0122270 A1* | 4/2019 | Sustik ............... G06Q 30/0283 |
| 2019/0266626 A1 | 8/2019 | Khosla |

(56) References Cited

U.S. PATENT DOCUMENTS

2020/0089515 A1 3/2020 Hari
2020/0160242 A1 5/2020 Johnson

FOREIGN PATENT DOCUMENTS

WO 2008115989 A2 9/2008
WO 2021149075 A1 7/2021

OTHER PUBLICATIONS

Obermiller et al., "Customized Pricing: Win Win or End Run?" Apr. 2012; Drake Management Review, vol. 1, Issue 2, 17 pages (Year: 2012).*
U.S. Appl. No. 16/779,340, filed Jan. 31, 2020.
U.S. Appl. No. 16/779,378, filed Jan. 31, 2020.
U.S. Appl. No. 16/779,381, filed Jan. 31, 2020.
U.S. Appl. No. 16/779,383, filed Jan. 31, 2020.
U.S. Appl. No. 16/910,436, filed Jun. 24, 2020.
Non-Final Office Action for U.S. Appl. No. 16/779,378 dated Jul. 9, 2021, 26 pages.
Office Action (Non-Final Rejection) dated Feb. 24, 2022 for U.S. Appl. No. 16/779,383 (pp. 1-27).
Office Action (Non-Final Rejection) dated May 25, 2022 for U.S. Appl. No. 16/779,340 (pp. 1-12).
Office Action (Final Rejection) dated Dec. 16, 2022 for U.S. Appl. No. 16/779,340 (pp. 1-12).
API, wikipedia, archives org webpages, Jun. 24, 2020 https://web.archive.org/web/20200624204020/https://en.wikipedia.org/wiki/Application_programming_interface (Year: 2020).
Dewan et al, Adoption of Internet-Based Product Customization and Pricing Strategies. Journal of Management Information Systems. Aug. 30, 2000 17-2 9-28 https://dl.acm.org/doi/abs/10.5555/1289629.1289632 (Year: 2000).
Non-Final Office Action for U.S. Appl. No. 16/910,436 dated Sep. 8, 2021, 31 pages.

* cited by examiner

PLUGGABLE ARCHITECTURE FOR PERFORMANCE OF PRICING OPERATIONS

TECHNICAL FIELD

Embodiments relate to techniques for computer operations. More particularly, embodiments relate to a pluggable architecture for performance of pricing operations.

BACKGROUND

In business operations, the generation of pricing is often a computationally intensive task. Each sales item of a large sales order or other pricing transaction may require a different pricing method, with each method requiring numerous processes.

In providing support for client pricing operations, a central pricing engine architecture can provide efficient and effective pricing operations for multiple clients without requiring the support of an internal pricing structure for each such client, thereby greatly benefiting client operations.

However, establishing or modifying the pricing for a particular client can require significant programming overhead for a pricing engine. A conventional pricing platform incorporates the pricing algorithm utilized to generate pricing within the pricing engine itself. As a result, the pricing platform needs to be programmed with each client's pricing operation, and needs to be modified when a pricing algorithm is added or modified for the client.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

In the following description, numerous specific details are set forth. However, embodiments may be practiced without these specific details. In other instances, well-known circuits, structures and techniques have not been shown in detail in order not to obscure the understanding of this description.

In some embodiments, an apparatus, system, or process is to provide for a pluggable architecture for performance of pricing operations. In contrast with a conventional pricing framework that incorporates a pricing algorithm for a client's pricing operation within the pricing engine (which may also be referred to herein as the host pricing engine or similar term), and thus must be modified when a pricing algorithm is added or modified, a pricing platform is implemented as a pluggable framework that enables incremental development of both internal pricing constructs as well as custom pricing constructs defined by partners, independent software vendors (ISVs), or customers (which may generally be referred to herein as clients). Pricing logic (referred to as a pricing method) is implemented as a plugin to the pricing engine that can be selected by the client.

In some embodiments, a host pricing engine has no knowledge regarding the pricing constructs that define the various pricing algorithms, allowing clients to define their own pricing constructs to suit their specific business needs without requiring modification of the pricing engine.

Further, the pricing framework both includes plugins for common use cases to be supported for multiple or all clients of the pricing engine (e.g., Standard Unit Price, Standard Term Price, or other standard pricing methods), and also allows customization of such standard plugins to enable certain clients, such as large enterprises, industry partners, and customers with special requirements to make modifications to the pricing methods as needed. Each pricing method includes one or more standard and/or custom pricing functions that can be modified or replaced. A custom pricing function may, for example, allow access to external proprietary data or processes. As used herein, "standard" refers to a method or function can be made available to multiple or all clients of a pricing system, while "custom" refers to a method or function that is generated for a particular client, and may, for example, utilize proprietary data or operations.

In some embodiments, a pricing platform includes the pluggable pricing engine supporting a pricing service. In this architecture, a pricing method defines the pricing for a particular sales item, with the pricing method plugging into the pricing platform. Each pricing method includes one or more pricing functions that define each operation that is performed in the pricing method.

Figure 2:
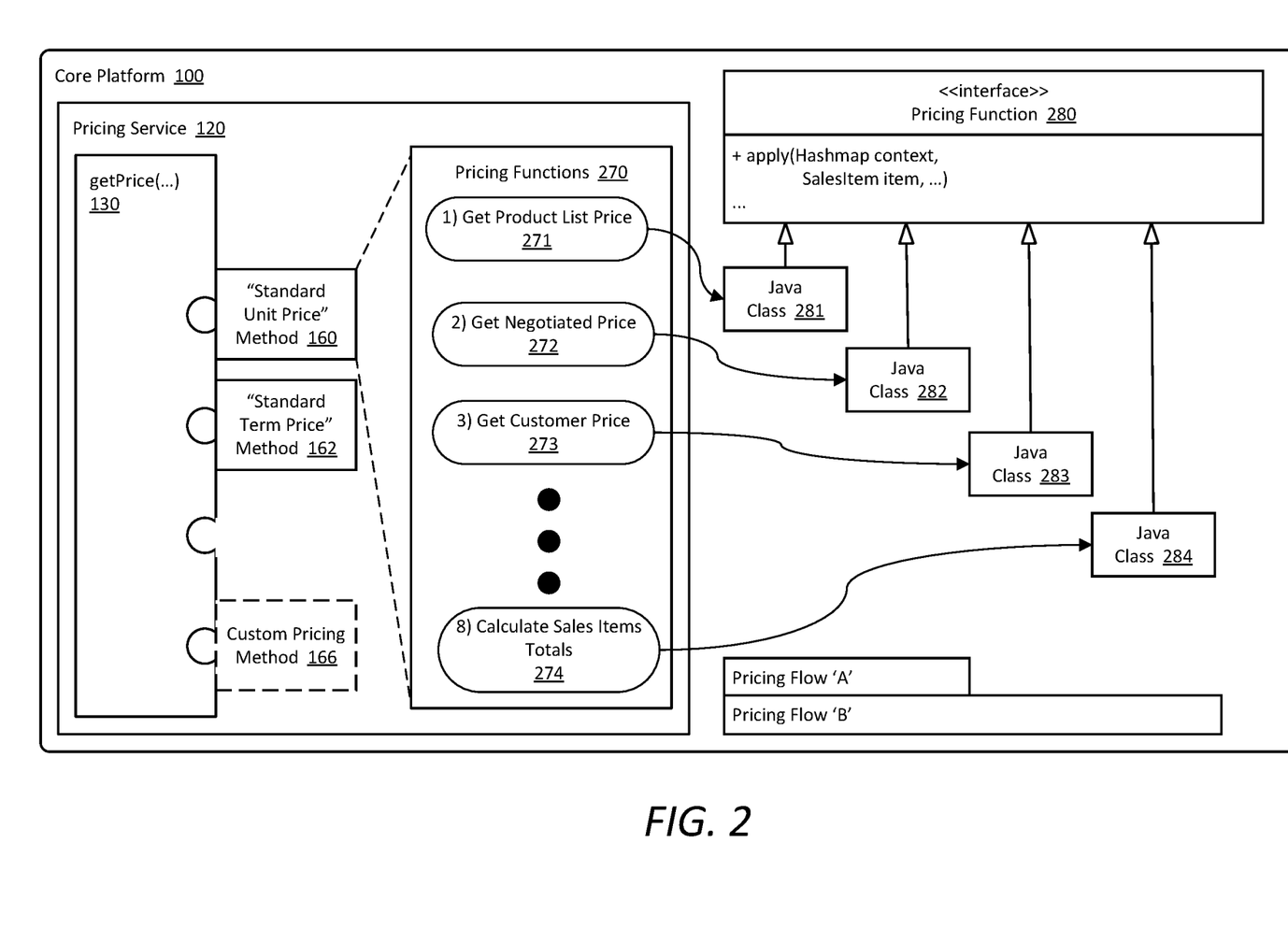
FIG. 2 is an illustration of a computing platform including a standard pricing method for a pluggable pricing architecture according to some embodiments.
Figure 3:
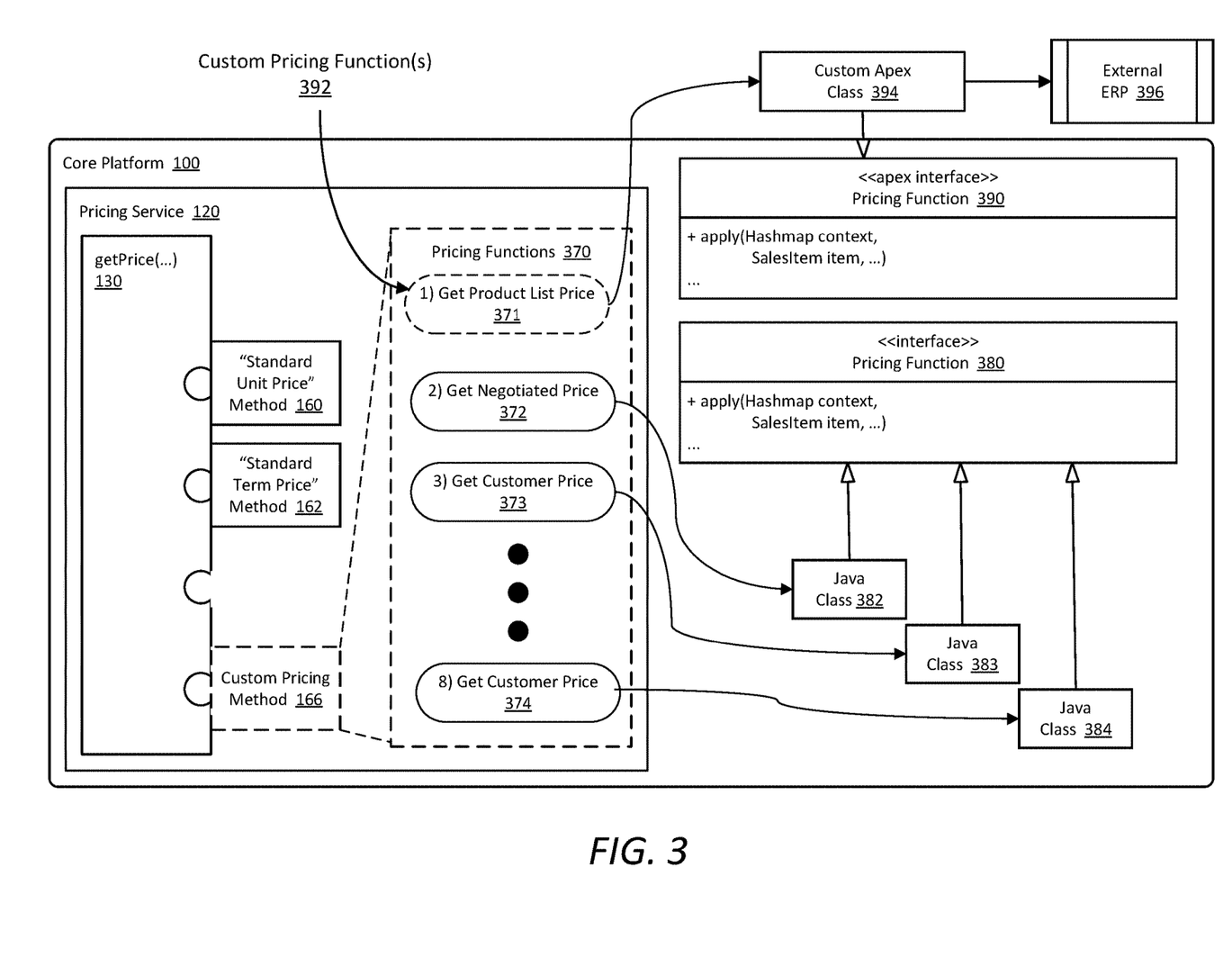
FIG. 3 is an illustration of a computing platform including a custom pricing method for a pluggable pricing architecture according to some embodiments.

Prior to any price calculations for a pricing request, the pricing engine is to validate the input parameters for the request, and has the option of pre-loading (for example, using cache storage) and validating any required pricing related data (which may include Product and PricebookEntry data, discount schedules, and other data.) In the price calculation for each sales item, each sales item is processed by first determining the appropriate pricing method from, such a determination based on the associated Product or PricebookEntry data or other similar data. Further, a context for calculating the sales item price is prepared and the appropriate pricing method (i.e., the pricing method plugin, such as illustrated in FIGS. 1-3) is invoked, with the pricing method being passed with the sales item context.

In some embodiments, pricing methods for a pricing engine are implemented as plugins to the pricing engine. As used herein, pricing method is comprised of an ordered set of pricing functions that define the calculation of pricing for a sales item. A pricing function is a cohesive logical pricing operation that defines a single process within a pricing method. Once the sales items in a particular pricing request have been priced according to the respective pricing method for each such sales item, aggregate pricing may then be performed, with aggregate pricing including summarizing totals at a header level, etc., to complete the full pricing operation for the pricing request. The pricing results may then be reported to the appropriate client.

As used herein, "sales transaction" refers to any sales order or inquiry for one or more sales items, with each sales item including a certain quantity; "pricing plan" refers to calculations performed to generate pricing for the one or more sales item in a sales transaction; and "pricing flow" refers to the context for a particular pricing request.

Figure 1:
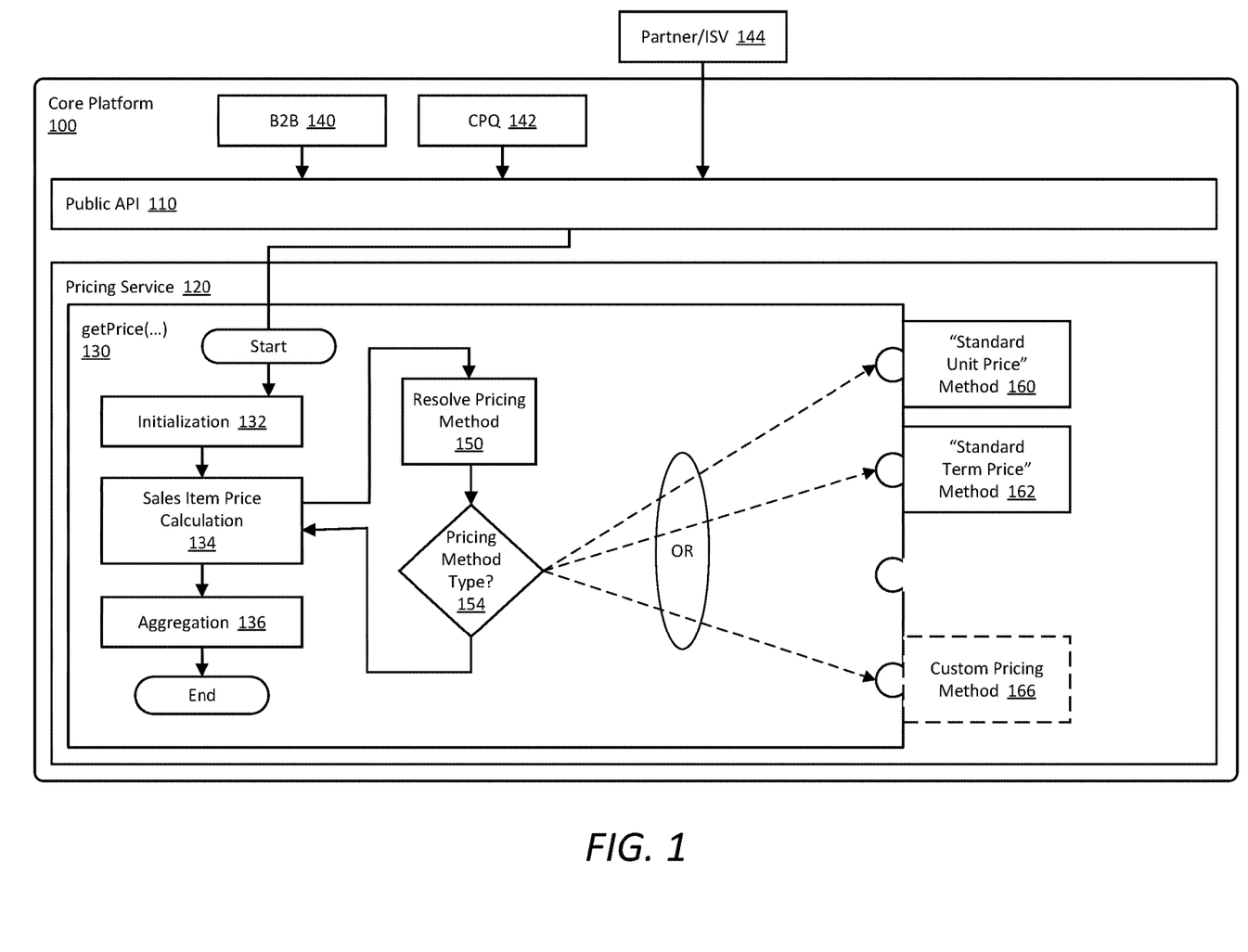
FIG. 1 is an illustration of a computing platform including a pluggable pricing architecture according to some embodiments.

FIG. 1 is an illustration of a computing platform including a pluggable pricing architecture according to some embodiments. As illustrated, a core computing platform 100 may provide multiple services including, but not limited to, a pricing service 120 (the host pricing service) to provide pricing operations for multiple different types of sales operations for multiple clients. The core platform 100 may include numerous other operations and functions that are not described herein.

The core platform 100 may include a public application programming interface (API) 110 for connection of multiple different types of clients that may generate operation requests, including requests to the pricing service 120. The pricing requests may include business to business (B2B) requests 140 and configure-price-quote (CPQ) requests 142 provided within the core platform 100, and partner or independent software vendor (ISV) requests 144 received from outside the core platform 100. Other types of pricing requests may also be received.

The pricing service 120 in particular includes a getPrice function 130 to determine pricing for one or more sales items in a sales transaction, the sales items being any combination of goods and services. In a basic operation, the getPrice function for a particular request includes initialization of the pricing operation 132, sales price calculation for each sales item of the request 134, and aggregation of the pricing calculations to generate a pricing output 136 to be provided to the client. In some embodiments, the sale item price calculation 134 includes resolving a pricing method for a sales item 150, wherein each sales item may utilize a different pricing method, and selecting and running the appropriate pricing method 154 for the sales item.

In some embodiments, the pricing architecture is a pluggable architecture in which multiple different pricing methods may be plugged for use in one or more sale transactions. The pricing method for a sales item may include a pricing method of one or more standard pricing methods provided by the pricing service, or a particular custom pricing method of one or more custom pricing methods for the client. In a particular example, the pricing methods available at particular point in time for a client utilizing the pricing service 120 are a Standard Unit Price method 160, a Standard Term Price method 162, or a custom pricing method 166. In some embodiments, the standard pricing methods 160 and 162 are available to multiple or all clients of the pricing service, and the custom pricing method 166 is available only to a particular client, wherein the custom pricing method 166 may include confidential and exclusive features established by or for the client. Any number of pricing methods may be available in a particular implementation. In some embodiments, pricing methods are plugged into the pricing service 120 without requiring modification or reprogramming of the pricing service 120, and such pricing methods may be replaced by other or different pricing methods as required for all clients or any particular client or clients.

FIG. 2 is an illustration of a computing platform including a standard pricing method for a pluggable pricing architecture according to some embodiments. As illustrated, the core computing platform 100 includes pricing service 120, with the pricing service 120 including the getPrice function 130. The pricing methods to be plugged into the pluggable pricing architecture are a Standard Unit Price method 160, a Standard Term Price method 162, and a custom pricing method 166.

As illustrated in FIG. 2, the Standard Unit Price method 160 includes multiple pricing functions that performed as required in response to a pricing request. In this particular example, the Standard Unit Price method 160 includes the standard pricing functions: Get Produce List Price 271 represented by Java Class 281, Get Negotiated Price 272 represented by Java Class 282, Get Customer Price 273 represented by Java Class 283, and continuing through Calculate Sales Items Totals 274 represented by Java Class 284. In some embodiments, each of the Java classes 281-284 representing the standard pricing functions 271-274 are associated with a pricing function interface 280.

As further depicted in FIG. 2, the Standard Unit Price method 160 is comprised of an ordered sequence of logical processes that together complete the price calculation for a given sales item, with each logical process within the pricing method comprising a pricing function. In some embodiments, the pricing method is defined as metadata that declares the globally unique name of the pricing method, a set of specific set of pricing functions, the execution order of those pricing functions, and whether or not each function is applicable within the context of a specified Pricing Flow. For example, the FIG. 2 further illustrates a Pricing Flow A and a Pricing Flow B, each of which define a particular set of the pricing functions as being applicable in the pricing flow.

FIG. 2 illustrates a particular standard pricing method composed of standard pricing functions. In some embodiments, a pricing service also supports one or most custom pricing methods, which may allow for functions including client specific pricing.

FIG. 3 is an illustration of a computing platform including a custom pricing method for a pluggable pricing architecture according to some embodiments. As illustrated, the core computing platform 100 includes pricing service 120, with the pricing service 120 including the getPrice function 130. The pricing methods to be plugged into the pluggable pricing architecture are a Standard Unit Price method 160, a Standard Term Price method 162, and a custom pricing method 166. FIG. 3 specifically depicts a custom pricing method that leverages a single custom pricing function. However, embodiments are possible, in which any number of custom pricing functions may be utilized in a custom pricing method.

As illustrated in FIG. 3, the custom pricing method 166 includes multiple pricing functions that performed as required in response to a pricing request. In this particular example, the custom pricing method 160 includes a mixture of custom and standard pricing functions, and specifically one or more custom pricing functions 392 including a Get Product List Price 371, which is represented by a custom Apex class 394 to draw from an external ERP (Enterprise Resource Planning) system, thus allowing the client to utilize client-specific pricing data while operating within the pricing service 120. In this example, the custom pricing function 371 is followed by standard functions: Get Negotiated Price 372 represented by Java Class 382, Get Customer Price 373 represented by Java Class 383, and continuing through Calculate Sales Items Totals 374 represented by Java Class 384. In some embodiments, the custom Apex class 394 for the custom pricing function is associated with pricing function Apex interface 390, while each of the Java classes 382-384 representing the standard pricing functions 372-374 are associated with a pricing function interface 380.

Figure 4:
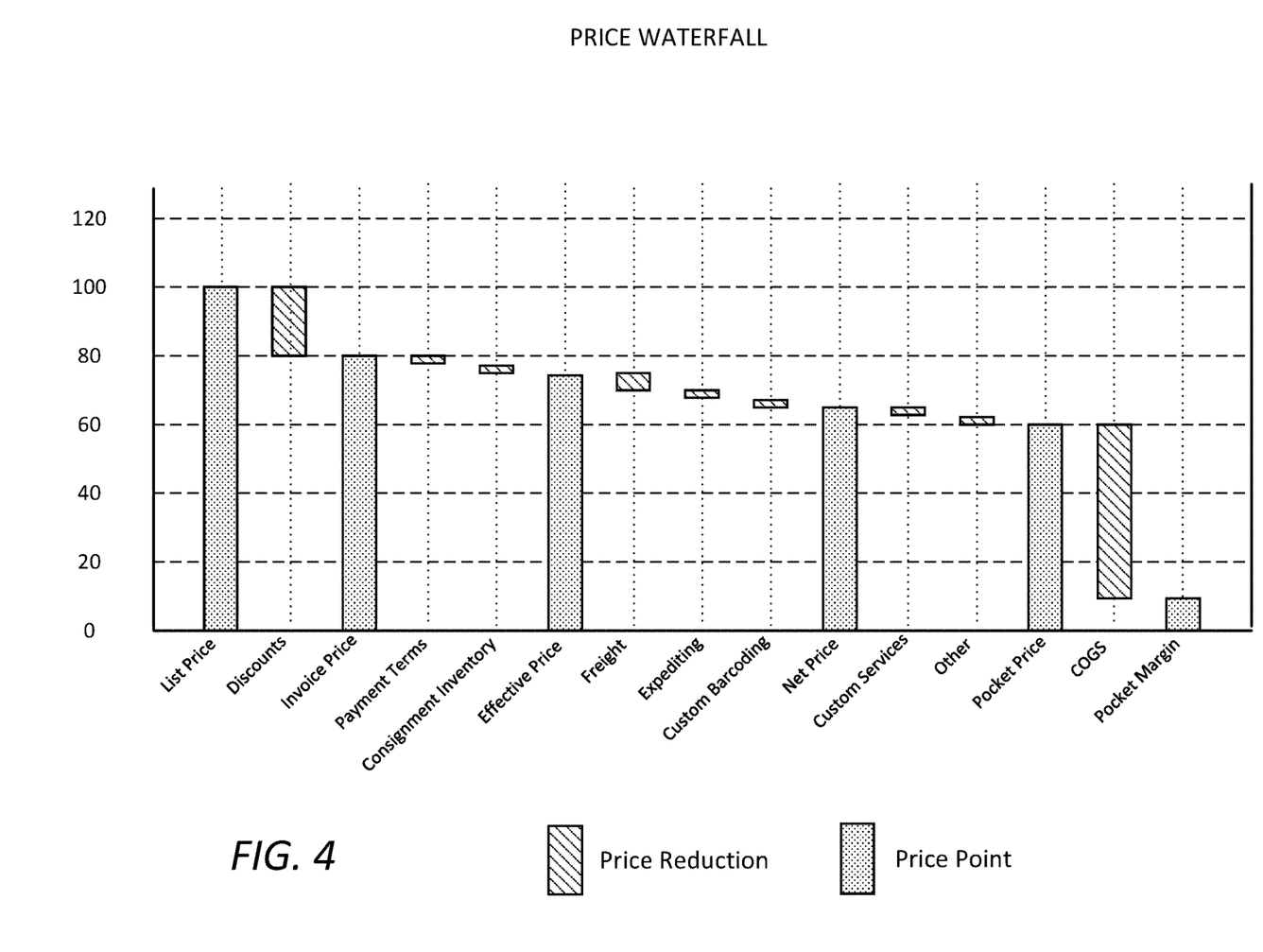
FIG. 4 illustrates a price waterfall for calculation of pricing for a sales item utilizing a particular pricing method.

FIG. 4 illustrates a price waterfall for calculation of pricing for a sales item utilizing a particular pricing method. The price waterfall provides a pricing method decomposition diagram for a particular pricing method, which may be any pricing method plugged into a pricing service, such as pricing methods 160-166 plugged into getPrice function 130 in FIGS. 1-3. In the illustrated price waterfall, the price of a given product is reflected on the 'y' axis (i.e., the vertical axis) and the various adjustments to the list price are represented on the 'x' axis (horizontal axis). The bars with cross-hatching represent price reductions applied to the previous process in the price waterfall. The shaded bars represent 'price points' and typically define the boundary between pricing functions that comprise the pricing method that results in this price waterfall.

In the illustrated example, commencing with the list price, there are discount price reduction resulting in an invoice price; payment terms and consignment inventory price reductions resulting in the effective price; freight, expediting, and custom bar coding price reductions resulting in the net price; custom service and other price reductions resulting in the pocket price; and the cost of goods sold (COGS) resulting in the pocket margin. Many other pricing reductions and price points may be present in other examples.

Figure 5:
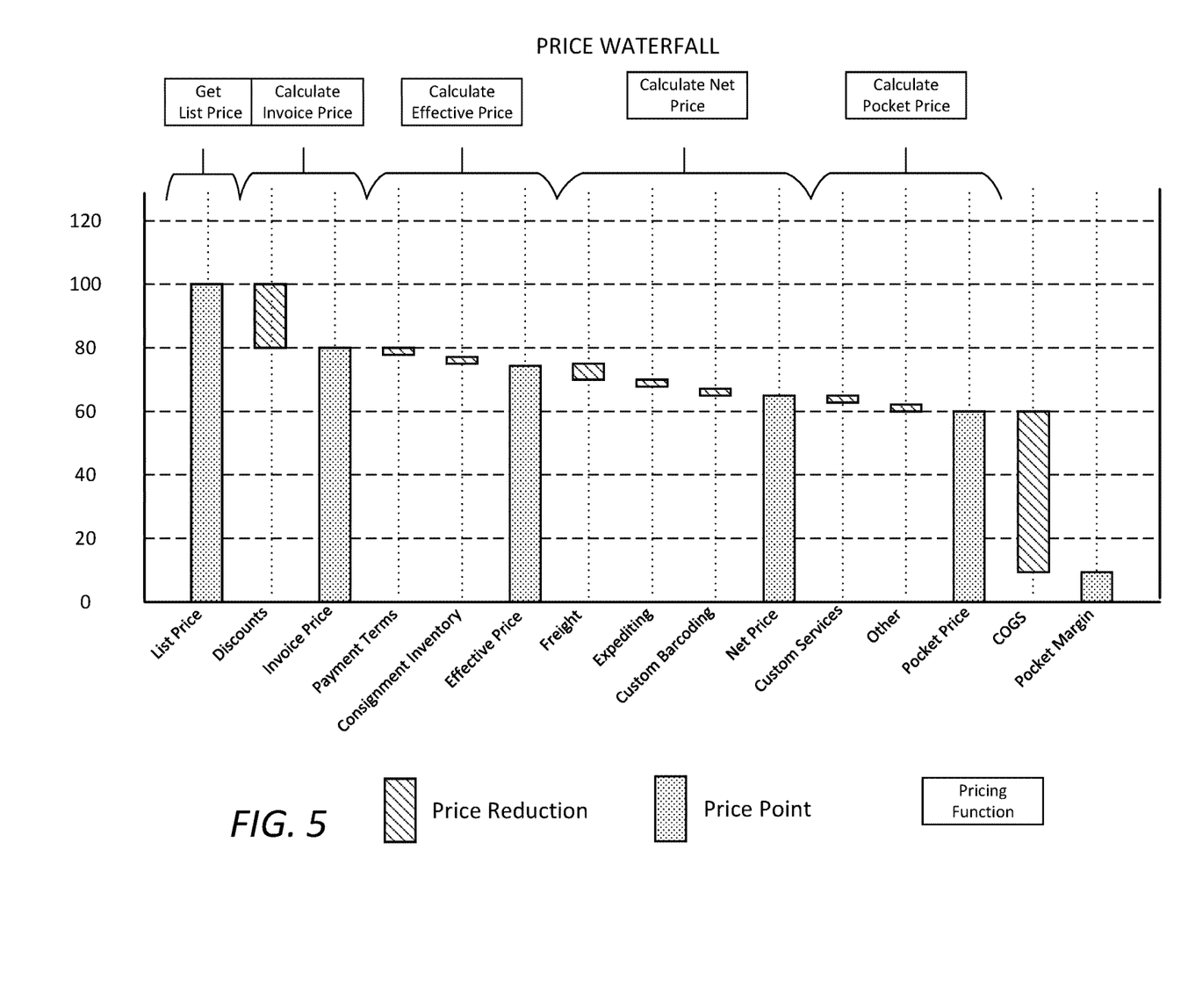
FIG. 5 illustrates a price waterfall including pricing functions of a pricing method for calculation of pricing for a sales item.

FIG. 5 illustrates a price waterfall including pricing functions of a pricing method for calculation of pricing for a sales item. FIG. 5 provides a pricing method decomposition diagram that includes the structure of FIG. 4, with the addition of exemplary pricing functions that make up the illustrated pricing method. A pricing function is a cohesive unit of price calculation processing that performs a single functional process within one or more pricing methods. In a particular implementation, default pricing functions that are provided are written in a first format (Java) and adhere to a common 'PricingFunction' Java interface, while custom pricing functions are written in a second format (Apex).

As diagram in FIG. 5 illustrates, the pricing functions that make up a given pricing method are executed in sequence within the context of a sales item and pricing flow. FIG. 5 illustrates the contribution of each pricing function to the price waterfall associated with the pricing method, wherein the pricing functions in this particular example being:

Get List Price—Obtaining the List Price.

Calculate Invoice Price—Subtracting discounts from the List Price to generate the Invoice Price.

Calculate Effective Price—Subtracting payment terms and consignment inventory from the Invoice Price to generate the Effective Price.

Calculate Net Price—Subtracting freight, expediting, and custom barcoding from the Effective Price to generate the Net Price.

Calculate Pocket Price—Subtracting discounts from the List Price to generate the Invoice Price.

In the price waterfall diagram provided in FIG. 5 the contribution each pricing function makes to the pricing method's waterfall is depicted along the 'x' axis, with the depicted price points representing the final output of each pricing function. The pricing functions are ordered (from left to right in FIG. 5) with regard to execution within the particular pricing method. Each pricing function may contribute zero or more intermediate price calculations (for example, Payment Terms and Consignment Inventory within the Calculate Effective Price function), and each pricing function has a final price point that represents the final price calculation for that pricing function.

Figure 6:
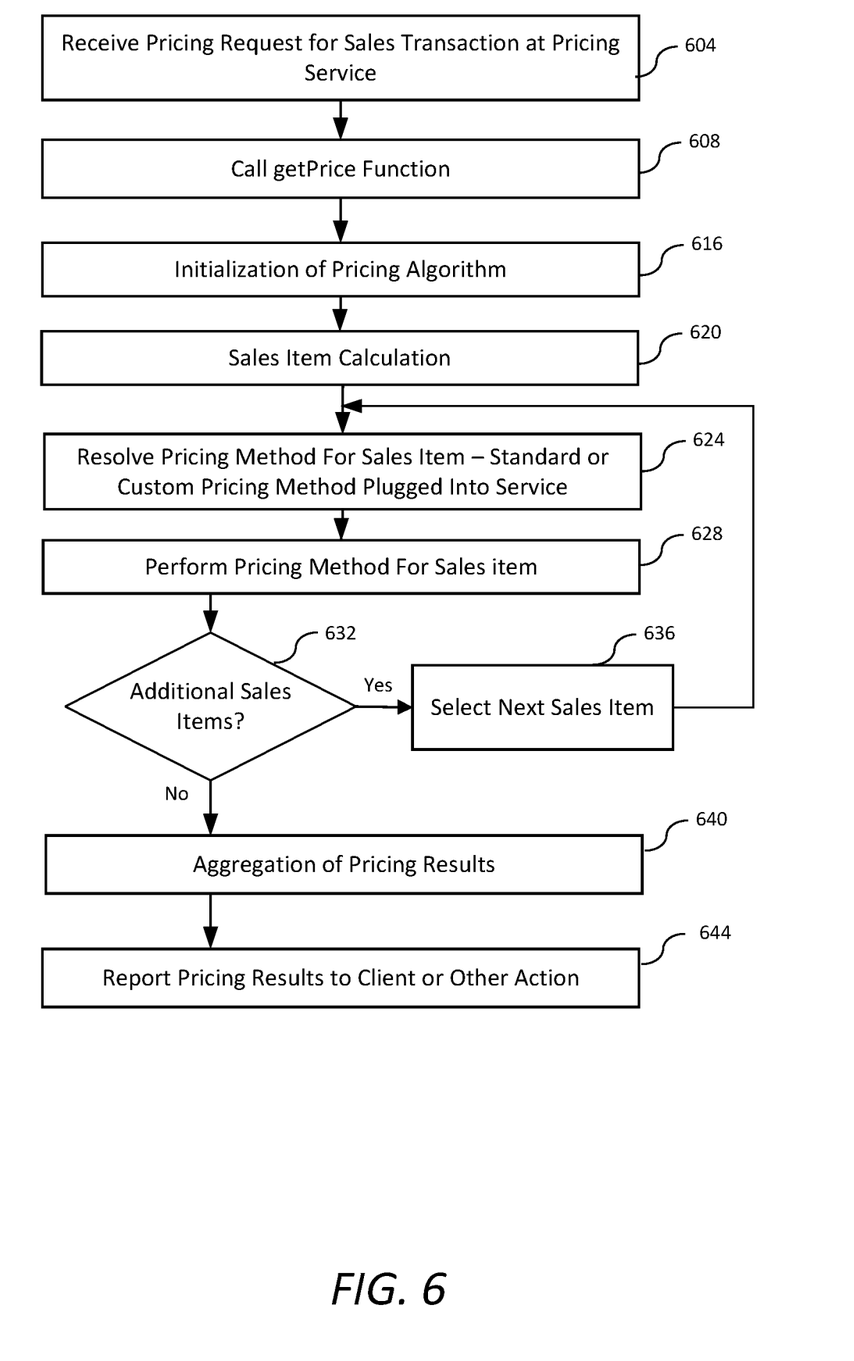
FIG. 6 is a flowchart to illustrate a process for pricing utilizing a pricing service according to some embodiments.

FIG. 6 is a flowchart to illustrate a process for pricing utilizing a pricing service according to some embodiments. In some embodiments, a process includes receiving a pricing request for a pricing transaction at a pricing service 604, wherein the pricing service may be pricing service 120 within core platform 100 as illustrated in FIGS. 1-3. A get price function is called 608 to perform pricing for the one or more sales items in the pricing transaction, such as getPrice 130 as illustrated in FIGS. 1-3.

The process may continue with initialization of the pricing algorithm 616, and sales price calculation for each sales item in the pricing transaction 620. Commencing with a first sales item, a pricing method is resolved for the pricing method 624, wherein the pricing method may either a standard pricing method or a custom pricing method, as illustrated in FIGS. 2 and 3, provided as plug in for the pricing service. The pricing method is then performed for the sales item 628. If there are additional sales items to be processed in the sales transaction 632, a next sales item is selected 636, and the process returns to resolving the appropriate pricing method for the sales item 624 and performing the pricing method for the sales item 628.

When there are no further sales items for processing in the sales transaction, the process may proceed to aggregation of the pricing results 640 and reporting of the aggregated pricing results to the client or other action relating to the aggregated pricing results 644.

The examples illustrating the use of technology disclosed herein should not be taken as limiting or preferred. The examples are intended to sufficiently illustrate the technology disclosed without being overly complicated and are not intended to illustrate all of the technologies disclosed. A person having ordinary skill in the art will appreciate that there are many potential applications for one or more implementations of this disclosure and hence, the implementations disclosed herein are not intended to limit this disclosure in any fashion.

One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Other implementations may include a non-transitory computer readable storage medium storing instructions executable by a processor to perform a method as described above. Yet another implementation may include a system including memory and one or more processors operable to execute instructions, stored in the memory, to perform a method as described above.

Implementations may include:

In some embodiments, one or more non-transitory computer-readable storage mediums having stored thereon executable computer program instructions that, when executed by one or more processors, cause the one or more processors to perform operations including installing a plurality of pricing methods at a pricing service, the pricing service including a pluggable architecture to accept the plurality of pricing methods, each pricing method of the plurality of pricing method including a set of pricing functions; receiving at the pricing service a pricing request from a first client for a sales transaction including one or more sales items, the pricing request including a pricing context for each of the one or more sales items; and performing a price calculation for the sales transaction, including resolving a pricing method for each sales item of the one or more sales items from the plurality of pricing methods, applying the set of pricing functions for the resolved pricing method for each sales item, wherein the application of the set of pricing functions is based at least in part on the pricing context for the sales item, calculating a price for each sales item based upon an outcome of the set of pricing functions, and aggregating the calculated prices for each of the one or more sales items.

In some embodiments, a system includes one or more processors for processing of data; an application programming interface (API) to receive pricing requests from one or more clients; and a pricing service, the pricing service including a pluggable architecture for installation of a plurality of pricing methods at a pricing service, each pricing method of the plurality of pricing method including a set of pricing functions, wherein, in response to receiving a pricing requests for a sales transaction from a first client, the sales transaction including one or more sales items and including a pricing context for each of the one or more sales items, the system is to perform a price calculation for each of the one or more sales items, including the system to resolve a pricing method for each sales item from the plurality of pricing methods, apply the set of pricing functions for the resolved pricing function for each sales item, wherein the application of the set of pricing functions is based at least in part on the pricing context for the sales item, calculate a price for each sales item based upon an outcome of the set of pricing functions, and aggregate the calculated prices for each of the one or more sales items.

In some embodiments, a method includes installing a plurality of pricing methods at a pricing service, the pricing service including a pluggable architecture to accept the plurality of pricing methods, each pricing method of the plurality of pricing method including a set of pricing functions; receiving at the pricing service a pricing request from a first client for a sales transaction including one or more sales items, the pricing request including a pricing context for each of the one or more sales items; resolving a pricing method for each sales item of the one or more sales items from the plurality of pricing methods; applying the set of pricing functions for the resolved pricing method for each sales item of the one or more sales items, wherein the application of the set of pricing functions is based at least in part on the pricing context for the sales item; calculating a price for each sales item based upon an outcome of the set of pricing functions for the resolved pricing method; and aggregating the calculated prices for each of the one or more sales items.

Figure 7:
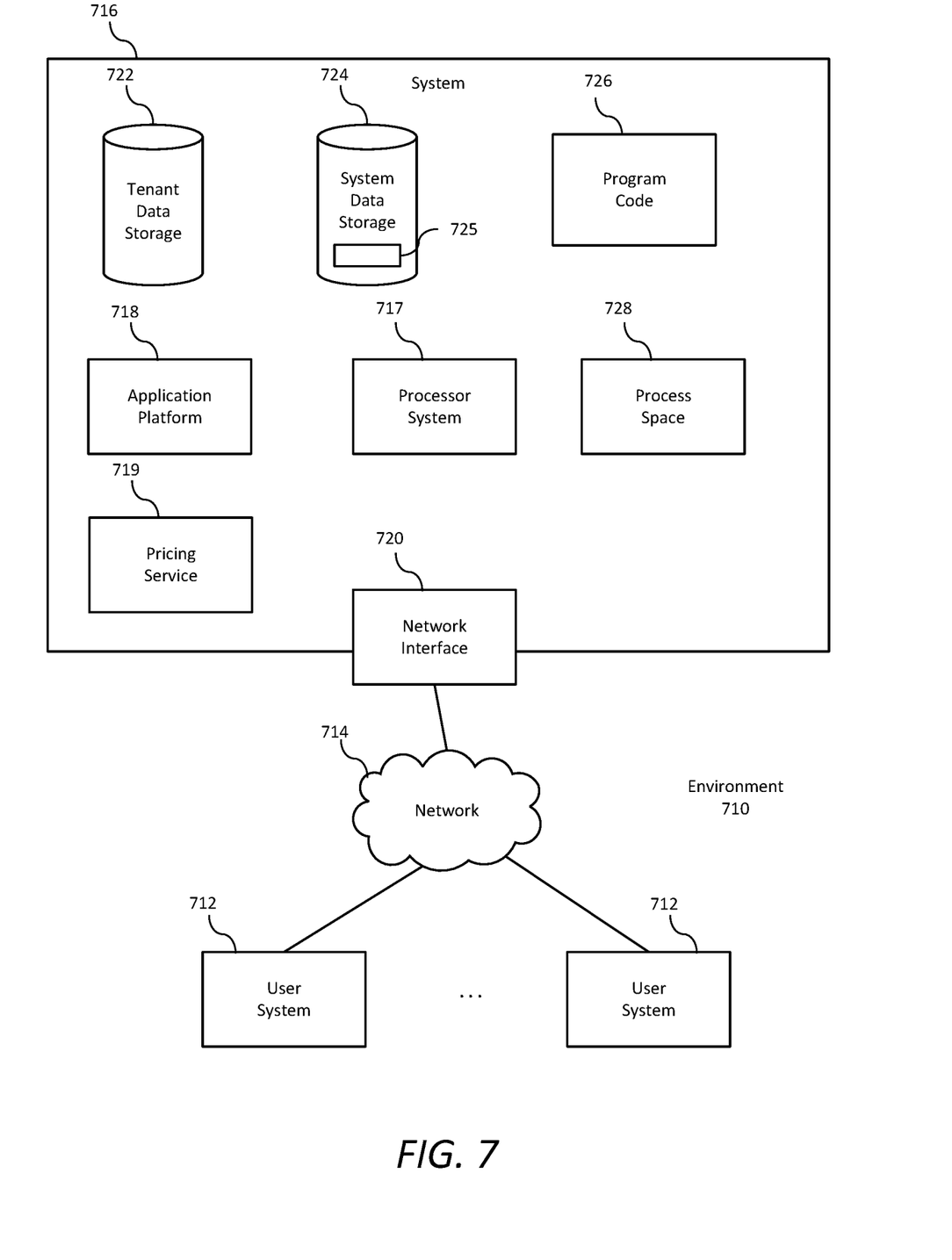
FIG. 7 illustrates a block diagram of an environment in which a pluggable architecture for performance of pricing operations may be implemented according to some embodiments.

FIG. 7 illustrates a block diagram of an environment in which a pluggable architecture for performance of pricing operations may be implemented according to some embodiments. In some embodiments, the environment 710 includes a pluggable architecture for performance of pricing operations, such as illustrated in FIGS. 1-6, including a pricing service 719, such as pricing service 120 illustrated in FIGS. 1-3. The environment 710 may include user systems 712, network 714, system 716, processor system 717, application platform 718, network interface 720, tenant data storage 722, system data storage 724, program code 726, and process space 728. In other embodiments, environment 710 may not have all of the components listed and/or may have other elements instead of, or in addition to, those listed above.

Environment 710 is an environment in which an on-demand database service exists. User system 712 may be any machine or system that is used by a user to access a database user system. For example, any of user systems 712 can be a handheld computing device, a smart phone, a laptop or tablet computer, a work station, and/or a network of computing devices. As illustrated in herein FIG. 7 and in more detail in FIG. 8, user systems 712 may interact via a network 714 with an on-demand database service, such as system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" may be used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third-party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 7, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third-party developer) applications, which may or may not include CRM, may be supported by the application platform 718, which manages creation, storage of the applications into one or more database objects and executing of the applications in a virtual machine in the process space of the system 716.

One arrangement for elements of system 716 is shown in FIG. 7, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 7 include conventional, well-known elements that are explained only briefly here. For example, each user system 712 could include a desktop personal computer, workstation, laptop or tablet computer, smart phone, or any wireless access protocol (WAP) enabled device or any other computing device capable of interfacing directly or indirectly to the Internet or other network connection. User system 712 typically runs an HTTP client, e.g., a browsing program (also referred to as a web browser or browser), such as Edge or Internet Explorer from Microsoft, Safari from Apple, Chrome from Google, Firefox from Mozilla, or a WAP-enabled browser in the case of a smart phone or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, touch pad, touch screen, pen, voice interface, gesture recognition interface, or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Core series processor or the like. Similarly, system 716 (and additional instances of an MTS, where more than one is present) and all of their components might be operator configurable using application(s) including computer code to run using a central processing unit such as processor system 717, which may include an Intel Core series processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 716 to intercommunicate and to process webpages, applications and other data and media content as described herein are preferably downloaded and stored on a hard disk or solid state drive (SSD), but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun Microsystems, Inc.).

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 8:
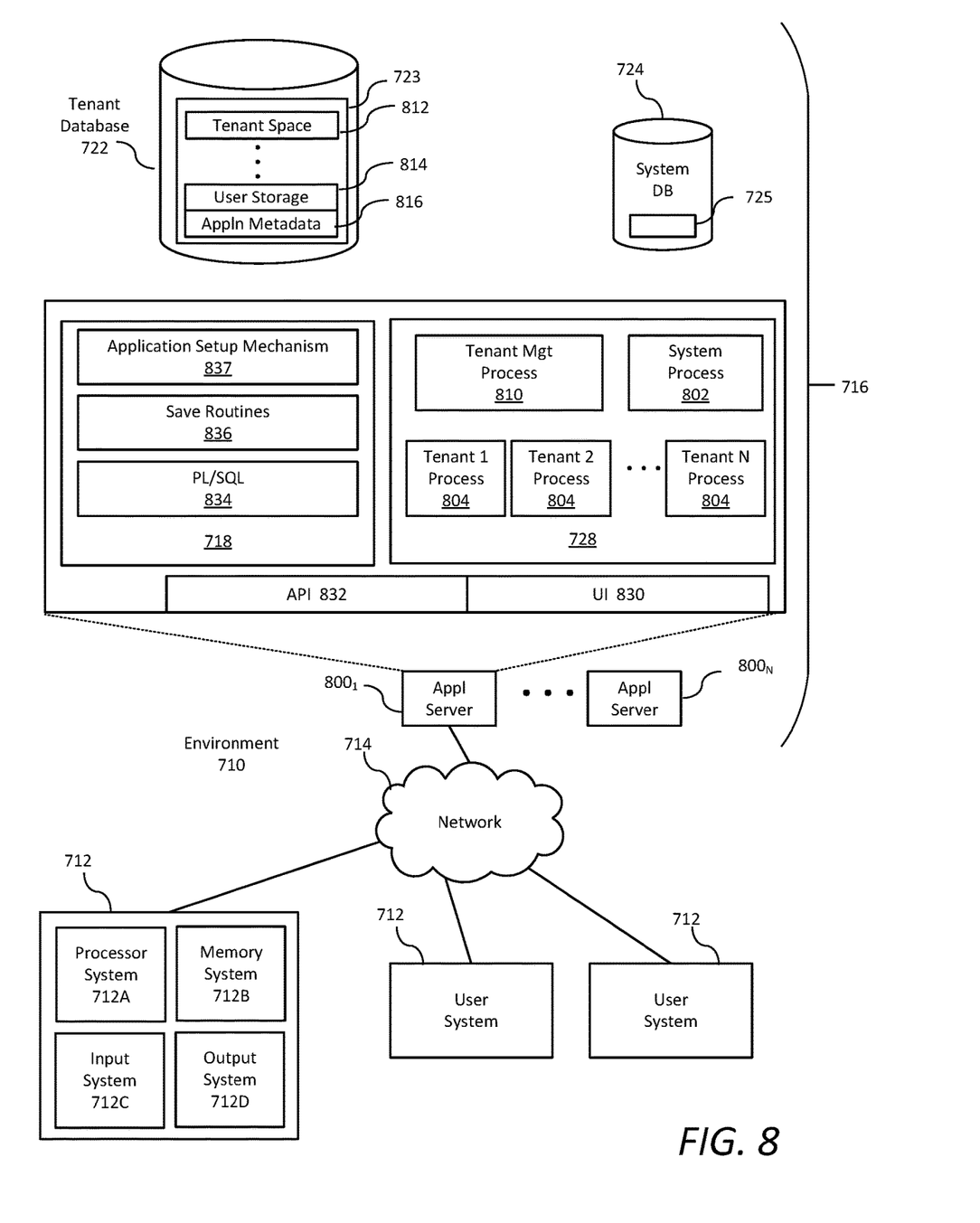
FIG. 8 illustrates further details of an environment in which a pluggable architecture for performance of pricing operations may be implemented according to some embodiments.

FIG. 8 illustrates further details of an environment in which a pluggable architecture for performance of pricing operations may be implemented according to some embodiments. FIG. 8 provides further detail regarding elements of system 716. In addition, various interconnections in an embodiment are provided. FIG. 8 shows that user system 712 may include processor system 712A, memory system 712B, input system 712C, and output system 712D. FIG. 8 shows network 714 and system 716. FIG. 8 also shows that system 716 may include tenant data storage 722, tenant data 723, system data storage 724, system data 725, User Interface (UI) 830, Application Programming Interface (API) 832, PL/SOQL 834, save routines 836, application setup mechanism 838, applications servers $800_1$-$800_N$, system process space 802, tenant process spaces 804, tenant management process space 810, tenant storage area 812, user storage 814, and application metadata 816. In other embodiments, environment 710 may not have the same elements as those listed above and/or may have other elements instead of, or in addition to, those listed above.

User system 712, network 714, system 716, tenant data storage 722, and system data storage 724 were discussed above in FIG. 7. Regarding user system 712, processor system 712A may be any combination of one or more processors. Memory system 712B may be any combination of one or more memory devices, short term, and/or long-term memory. Input system 712C may be any combination of input devices, such as one or more keyboards, mice, trackballs, scanners, cameras, and/or interfaces to networks. Output system 712D may be any combination of output devices, such as one or more monitors, printers, and/or interfaces to networks. As shown by FIG. 8, system 716 may include a network interface 720 (of FIG. 7) implemented as a set of HTTP application servers 800, an application platform 718, tenant data storage 722, and system data storage 724. Also shown is system process space 802, including individual tenant process spaces 804 and a tenant management process space 810. Each application server 800 may be configured to tenant data storage 722 and the tenant data 723 therein, and system data storage 724 and the system data 725 therein to serve requests of user systems 712. The tenant data 723 might be divided into individual tenant storage areas 812, which can be either a physical arrangement and/or a logical arrangement of data. Within each tenant storage area 812, user storage 814 and application metadata 816 might be similarly allocated for each user. For example, a copy of a user's most recently used (MRU) items might be stored to user storage 814. Similarly, a copy of MRU items for an entire organization that is a tenant might be stored to tenant storage area 812. A UI 830 provides a user interface and an API 832 provides an application programmer interface to system 716 resident processes to users and/or developers at user systems 712. The tenant data and the system data may be stored in various databases, such as one or more Oracle™ databases.

Application platform 718 includes an application setup mechanism 838 that supports application developers' creation and management of applications, which may be saved as metadata into tenant data storage 722 by save routines 836 for execution by subscribers as one or more tenant process spaces 804 managed by tenant management process 810 for example. Invocations to such applications may be coded using PL/SOQL 834 that provides a programming language style interface extension to API 832. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 816 for the subscriber making the invocation and executing the metadata as an application in a virtual machine.

Each application server 800 may be communicably coupled to database systems, e.g., having access to system data 725 and tenant data 723, via a different network connection. For example, one application server $800_1$ might be coupled via the network 714 (e.g., the Internet), another application server $800_{N-1}$ might be coupled via a direct network link, and another application server $800_N$ might be coupled by yet a different network connection. Transfer Control Protocol and Internet Protocol (TCP/IP) are typical protocols for communicating between application servers 800 and the database system. However, it will be apparent to one skilled in the art that other transport protocols may be used to optimize the system depending on the network interconnect used.

In certain embodiments, each application server 800 is configured to handle requests for any user associated with any organization that is a tenant. Because it is desirable to be able to add and remove application servers from the server pool at any time for any reason, there is preferably no server affinity for a user and/or organization to a specific application server 800. In one embodiment, therefore, an interface system implementing a load balancing function (e.g., an F5 BIG-IP load balancer) is communicably coupled between the application servers 800 and the user systems 712 to distribute requests to the application servers 800. In one embodiment, the load balancer uses a least connections algorithm to route user requests to the application servers 800. Other examples of load balancing algorithms, such as round robin and observed response time, also can be used. For example, in certain embodiments, three consecutive requests from the same user could hit three different application servers 800, and three requests from different users could hit the same application server 800. In this manner, system 716 is multi-tenant, wherein system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of an MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 800 to request and update system-level and tenant-level data from system 716 that may require sending one or more queries to tenant data storage 722 and/or system data storage 724. System 716 (e.g., an application server 800 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, with U.S. Pat. No. 7,779,039, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Embodiments may be provided, for example, as a computer program product which may include one or more machine-readable media (including a non-transitory machine-readable or computer-readable storage medium) having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic tape, magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

While concepts been described in terms of several embodiments, those skilled in the art will recognize that embodiments not limited to the embodiments described but can be practiced with modification and alteration within the spirit and scope of the appended claims. The description is thus to be regarded as illustrative instead of limiting.

What is claimed is:

1. One or more non-transitory computer-readable storage mediums having stored thereon executable computer program instructions that, when executed by one or more processors, cause the one or more processors to perform operations comprising:
   implementing a pricing service, at a server, as a pluggable architecture, the pluggable architecture excluding, and having no knowledge regarding, pricing constructs that define various pricing algorithms;
   installing a plurality of pricing methods as plugins into the pluggable architecture of the pricing service, each pricing method of the plurality of pricing method including a set of pricing functions, wherein the pricing methods are installed such that clients can modify or customize individual pricing methods in the plurality of pricing methods without requiring modification of the pluggable architecture;
   receiving at the pricing service a pricing request from a first client for a sales transaction including one or more sales items, the pricing request including a pricing context for each of the one or more sales items; and
   performing a price calculation for the sales transaction, including:
   resolving a pricing method for each sales item of the one or more sales items from the plurality of pricing methods,
   applying the set of pricing functions for the resolved pricing method for each sales item, wherein application of the set of pricing functions is based at least in part on the pricing context for the sales item,
   calculating a price for each sales item based upon an outcome of the set of pricing functions, and
   aggregating the calculated prices for each of the one or more sales items.

2. The one or more storage mediums of claim 1, wherein the plurality of pricing methods includes:
   one or more standard pricing methods for use by multiple clients; and
   one or more custom pricing methods for the first client.

3. The one or more storage mediums of claim 2, wherein each pricing function of a set of pricing functions of a pricing method defines a single process within the pricing method.

4. The one or more storage mediums of claim 3, wherein each pricing function is defined in code.

5. The one or more storage mediums of claim 4, wherein the pricing functions of the one or more standard pricing methods are coded in a first format and the pricing functions of the one or more custom pricing functions are coded in a second format.

6. The one or more storage mediums of claim 2, wherein the one or more custom pricing methods include one or more custom pricing functions.

7. The one or more storage mediums of claim 1, wherein the pricing service is a portion of a platform, the platform including an application programming interface (API) to receive pricing requests.

8. The one or more storage mediums of claim 1, wherein the instructions further include instructions for reporting the aggregated pricing to the first client.

9. A system comprising:
   a processor; and
   memory, the memory storing instructions to cause the processor to execute a method, the method comprising:
   implementing a pricing service, at a server, as a pluggable architecture, the pluggable architecture excluding, and having no knowledge regarding, pricing constructs that define various pricing algorithms;
   installing a plurality of pricing methods as plugins into the pluggable architecture of the pricing service, each pricing method of the plurality of pricing method including a set of pricing functions, wherein the pricing methods are installed such that clients can modify or customize individual pricing methods in the plurality of pricing methods without requiring modification of the pluggable architecture;
   receiving at the pricing service a pricing request from a first client for a sales transaction including one or more sales items, the pricing request including a pricing context for each of the one or more sales items; and
   performing a price calculation for the sales transaction, including:
   resolving a pricing method for each sales item of the one or more sales items from the plurality of pricing methods,
   applying the set of pricing functions for the resolved pricing method for each sales item, wherein application of the set of pricing functions is based at least in part on the pricing context for the sales item,
   calculating a price for each sales item based upon an outcome of the set of pricing functions, and
   aggregating the calculated prices for each of the one or more sales items.

10. The system of claim 9, wherein the plurality of pricing methods includes:
    one or more standard pricing methods for use by multiple clients; and
    one or more custom pricing methods for the first client.

11. The system of claim 10, wherein each pricing function of a set of pricing functions of a pricing method defines a single process within the pricing method.

12. The system of claim 10, wherein the one or more custom pricing methods include one or more custom pricing functions.

13. The system of claim 9, wherein the pricing service does not have knowledge of pricing algorithms for the plurality of pricing methods.

14. A method comprising:
    implementing a pricing service, at a server, as a pluggable architecture, the pluggable architecture excluding, and having no knowledge regarding, pricing constructs that define various pricing algorithms;
    installing a plurality of pricing methods as plugins into the pluggable architecture of the pricing service, each pricing method of the plurality of pricing method including a set of pricing functions, wherein the pricing methods are installed such that clients can modify or customize individual pricing methods in the plurality of pricing methods without requiring modification of the pluggable architecture;
    receiving at the pricing service a pricing request from a first client for a sales transaction including one or more sales items, the pricing request including a pricing context for each of the one or more sales items; and
    performing a price calculation for the sales transaction, including:
    resolving a pricing method for each sales item of the one or more sales items from the plurality of pricing methods, applying the set of pricing functions for the resolved pricing method for each sales item, wherein application of the set of pricing functions is based at least in part on the pricing context for the sales item, calculating a price for each sales item based upon an outcome of the set of pricing functions, and aggregating the calculated prices for each of the one or more sales items.

15. The method of claim 14, wherein the plurality of pricing methods includes:

one or more standard pricing methods for use by multiple clients; and one or more custom pricing methods for the first client.

16. The method of claim 15, wherein each pricing function of a set of pricing functions of a pricing method defines a single process within the pricing method.

17. The method of claim 15, wherein the one or more custom pricing methods include one or more custom pricing functions.

18. The method of claim 14, wherein the pricing service is a portion of a platform, the platform including an application programming interface (API) to receive pricing requests.

19. The method of claim 14, further comprising reporting the aggregated pricing to the first client.

* * * * *